US012012306B2

(12) United States Patent
Kattainen et al.

(10) Patent No.: US 12,012,306 B2
(45) Date of Patent: Jun. 18, 2024

(54) CONDITION MONITORING OF AN INDUCTIVE BRAKING DEVICE

(71) Applicant: KONE Corporation, Helsinki (FI)

(72) Inventors: Ari Kattainen, Helsinki (FI); Juhamatti Nikander, Helsinki (FI); Juha-Matti Aitamurto, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1000 days.

(21) Appl. No.: 16/379,435

(22) Filed: Apr. 9, 2019

(65) Prior Publication Data

US 2019/0330014 A1 Oct. 31, 2019

(30) Foreign Application Priority Data

Apr. 26, 2018 (EP) .................................... 18169392

(51) Int. Cl.

*B66B 5/00* (2006.01)
*B66B 1/34* (2006.01)
*B66B 1/36* (2006.01)
*B66B 19/00* (2006.01)

(52) U.S. Cl.

CPC .......... *B66B 5/0031* (2013.01); *B66B 1/3407* (2013.01); *B66B 1/3492* (2013.01);
(Continued)

(58) Field of Classification Search

CPC ........... B66B 5/0031; B66B 1/32; B66B 5/18; B66B 5/16; B66B 5/0006; B66B 5/044;
(Continued)

(56) References Cited

U.S. PATENT DOCUMENTS

2010/0154527 A1 6/2010 Illan
2014/0311257 A1 10/2014 Hubbard et al.
(Continued)

FOREIGN PATENT DOCUMENTS

CA 108726312 A * 11/2018 ............ B66B 5/044
CN 1266812 A * 9/2000
(Continued)

OTHER PUBLICATIONS

Search Report issued in European Patent Application No. 18169392.0, dated Oct. 18, 2018.
(Continued)

*Primary Examiner* — Marlon T Fletcher
(74) *Attorney, Agent, or Firm* — Birch, Stewart, Kolasch & Birch, LLP

(57) ABSTRACT

According to an aspect, there is provided a method for condition monitoring of inductive braking device of an elevator car in an elevator shaft, the method including determining that the elevator car is empty; determining that doors of the elevator car are closed; causing electromechanical brakes to hold the elevator car stationary in the elevator shaft; causing actuation of a braking condition for the elevator car with the inductive braking device; causing the electromechanical brakes to lift while the inductive braking device is in the braking condition; determining a value associated with the inductive braking device in response to causing the electromechanical brakes to lift while the inductive braking device is actuated; and determining an operating condition of the inductive braking device based on the value.

22 Claims, 3 Drawing Sheets

(52) U.S. Cl.
CPC .............. *B66B 1/36* (2013.01); *B66B 5/0025* (2013.01); *B66B 19/00* (2013.01)

(58) Field of Classification Search
CPC .. B66B 5/02; B66B 5/04; B66B 5/027; B66B 5/0037; B66B 1/36; B66B 5/00
See application file for complete search history.

(56) References Cited

U.S. PATENT DOCUMENTS

| | | | | |
|---|---|---|---|---|
| 2015/0191327 | A1 | 7/2015 | Rogers et al. | |
| 2016/0280507 | A1* | 9/2016 | Kattainen | B66B 5/027 |
| 2017/0008730 | A1 | 1/2017 | Kattainen et al. | |
| 2017/0050820 | A1 | 2/2017 | Kondo | |
| 2018/0134519 | A1* | 5/2018 | Kattainen | B66B 5/0031 |
| 2019/0177114 | A1* | 6/2019 | Fargo | B66B 5/16 |
| 2019/0330014 | A1* | 10/2019 | Kattainen | B66B 1/3407 |

FOREIGN PATENT DOCUMENTS

| | | | | | |
|---|---|---|---|---|---|
| CN | 102414110 | A | | 4/2012 | |
| CN | 106586761 | A | * | 4/2017 | |
| CN | 109476443 | A | * | 3/2019 | B66B 1/2466 |
| CN | 109896381 | A | * | 6/2019 | B66B 5/0037 |
| CN | 110407049 | A | * | 11/2019 | B66B 1/3407 |
| DE | 10300993 | A1 | * | 7/2004 | B66B 5/005 |
| EP | 1439144 | A2 | * | 7/2004 | B66B 5/005 |
| EP | 1 481 933 | A1 | | 12/2004 | |
| EP | 3 072 842 | A1 | | 9/2016 | |
| EP | 3 106 417 | A1 | | 12/2016 | |
| EP | 3560874 | A1 | * | 10/2019 | B66B 1/3407 |
| EP | 3753891 | A1 | * | 12/2020 | B66B 1/32 |
| GB | 1034727 | A | * | 9/1964 | |
| JP | 2016-74508 | A | | 5/2016 | |
| WO | WO-8809584 | A1 | * | 5/1988 | |
| WO | WO 01/46056 | A1 | | 6/2001 | |
| WO | WO-0146056 | A1 | * | 6/2001 | B66B 1/308 |
| WO | WO 2007/099913 | A1 | | 9/2007 | |
| WO | WO 2011/051571 | A1 | | 5/2011 | |
| WO | WO 2017/118590 | A1 | | 7/2017 | |

OTHER PUBLICATIONS

European Communication of a notice of opposition for European Application No. 18169392.0, dated Sep. 12, 2022.

* cited by examiner

CONDITION MONITORING OF AN INDUCTIVE BRAKING DEVICE

BACKGROUND

Elevators have electromechanical brakes that apply to a traction sheave or rotating axis of a hoisting machine to stop movement of the hoisting machine and therefore an elevator car operated by the hoisting machine. The electromechanical brakes are dimensioned to hold the elevator car with an overload at standstill in the elevator shaft. In addition, the brakes may be used in rescue situations and in emergency braking to stop the elevator car if an operational fault occurs, such as an overspeed situation of the elevator car. Due to this, the brakes may become large-sized and their control may become complicated.

Thus, it would be beneficial to have a solution that would alleviate at least one of these drawbacks.

SUMMARY

According to at least some of the aspects, a solution is provided that monitors a condition of an inductive braking device. The solution enables using the inductive braking device for safety-related elevator braking functions. A monitoring operation of the inductive braking device enables using low cost and reliable mechanical brake opening systems for manual rescue operation. In addition, smaller electromechanical brakes may be used, for example, in elevators in high-rise buildings, because the inductive braking device can be taken into account when dimensioning the braking system.

According to a first aspect, there is provided a method for monitoring of an inductive braking device of an elevator car in an elevator shaft. The method comprises causing electromechanical brakes to hold the elevator car stationary in the elevator shaft; causing actuation of a braking condition for the elevator car with the inductive braking device; causing the electromechanical brakes to lift while the inductive braking device is in the braking condition; determining a value associated with the inductive braking device in response to causing the electromechanical brakes to lift while the inductive braking device is actuated; and determining an operating condition of the inductive braking device based on the value.

In an embodiment, determining the value comprises determining a speed of the elevator car; and wherein determining the operating condition of the inductive braking device further comprises comparing the speed to a predefined speed threshold; and wherein determining that the inductive braking device is operational when the speed does not exceed the predefined speed threshold.

In an embodiment, additionally or alternatively, the method further comprises determining a location of the elevator car in the elevator shaft; and applying a predefined speed threshold that is specific for the location of the elevator car in the elevator shaft.

In an embodiment, additionally or alternatively, determining the value comprises determining a torque ripple based on at least one of signals from an accelerometer determining vibrations from the elevator car, signals from a motor encoder determining vibrations from a hoisting machine, signals from an encoder determining vibrations from an overspeed governor, or signals from a car encoder determining vibrations from the elevator car; and wherein determining the operating condition of the inductive braking device further comprises comparing the determined torque ripple to a reference torque ripple; and determining that the inductive braking device is not operational when the torque ripple has substantially increased compared to the reference torque ripple.

In an embodiment, additionally or alternatively, determining the value comprises determining a three-phase current of a motor of a hoisting machinery of the elevator from current sensors of a frequency converter coupled to the motor; and wherein determining the operating condition of the inductive braking device further comprises determining that the inductive braking device is not operational when at least one of the current sensors indicates that a phase is missing current.

In an embodiment, additionally or alternatively, determining the value comprises determining voltage from poles of a motor of a hoisting machine of the elevator; and wherein determining the operating condition of the inductive braking device further comprises determining that the inductive braking device is not operational when at least one pole shows voltage.

In an embodiment, additionally or alternatively, the method further comprises repeating the condition monitoring when the operation condition indicates that the inductive braking device is not operational.

In an embodiment, additionally or alternatively, the method further comprises repeating the condition monitoring of the inductive braking device at regular intervals.

In an embodiment, additionally or alternatively, the method further comprises, in response to determining the operating condition of the inductive braking device, taking the elevator car out of service when the inductive braking device is not operational.

In an embodiment, additionally or alternatively, the method further comprises, in response to determining the operating condition of the inductive braking device, enabling the use of the inductive braking device as an independent braking function or as an assistive brake when the inductive braking device is operational.

In an embodiment, additionally or alternatively, causing actuation of a braking condition for the elevator car with the inductive braking device comprises providing a short-circuit to windings of an elevator hoisting motor.

In an embodiment, additionally or alternatively, the method further comprises generating a signal indicating the condition of the inductive braking device; and transmitting the signal to a remote maintenance server.

In an embodiment, additionally or alternatively, the inductive braking device comprises a dynamic braking device comprising an elevator hoisting motor and one or more switches adapted to provide a short-circuit to windings of the elevator hoisting motor.

According to a second aspect of the invention, there is provided an apparatus for condition monitoring of an inductive braking device of an elevator car in an elevator shaft. The apparatus comprises means for causing electromechanical brakes to hold the elevator car stationary in the elevator shaft; means for causing actuation of a braking condition for the elevator car with the inductive braking device; means for causing the electromechanical brakes to lift while the inductive braking device is in the braking condition; means for determining a value associated with the inductive braking device in response to causing the electromechanical brakes to lift while the inductive braking device is actuated; and means for determining an operating condition of the inductive braking device based on the value.

In an embodiment, the means for determining the value comprises means for determining a speed of the elevator car; and wherein means for determining the operating condition of the inductive braking device further comprises means for comparing the speed to a predefined speed threshold; and means for determining that the inductive braking device is operational when the speed does not exceed the predefined speed threshold.

In an embodiment, additionally or alternatively, the means for determining the value comprises means for determining a location of the elevator car in the elevator shaft; and means for applying a predefined speed threshold that is specific for the location of the elevator car in the elevator shaft.

In an embodiment, additionally or alternatively, the means for determining the value comprises means for determining a torque ripple based on at least one of signals from an accelerometer determining vibrations from the elevator car, signals from a motor encoder determining vibrations from a hoisting machine, signals from an encoder determining vibrations from an overspeed governor, or signals from a car encoder determining vibrations from the elevator car; and wherein means for determining the operating condition of the inductive braking device further comprises means for comparing the determined torque ripple to a reference torque ripple; and means for determining that the inductive braking device is not operational when the torque ripple has substantially increased compared to the reference torque ripple.

In an embodiment, additionally or alternatively, the means for determining the value comprises determining a three-phase current of a motor of a hoisting machine of the elevator from current sensors of a frequency converter coupled to the motor; and wherein means for determining the operating condition of the inductive braking device further comprises means for determining that the inductive braking device is not operational when at least one of the current sensors indicates that a phase is missing current.

In an embodiment, additionally or alternatively, the means for determining the value comprises means for determining voltage from poles of a motor of a hoisting machine of the elevator; and wherein means for determining the operating condition of the inductive braking device further comprises means for determining that the inductive braking device is not operational when at least one pole shows voltage.

In an embodiment, additionally or alternatively, the apparatus further comprises means for repeating the condition monitoring when the operation condition indicates that the inductive braking device is not operational.

In an embodiment, additionally or alternatively, the apparatus further comprises means for repeating the condition monitoring of the inductive braking device at regular intervals.

In an embodiment, additionally or alternatively, the apparatus further comprises means for, in response to determining the operating condition of inductive braking device, taking the elevator car out of service when the inductive braking device is not in operating condition.

In an embodiment, additionally or alternatively, the apparatus further comprises means for, in response to determining the operating condition of inductive braking device, enabling the use of the inductive braking device as independent braking function or as an assistive brake when the inductive braking device is in operating condition.

In an embodiment, additionally or alternatively, the means for causing actuation of a braking condition for the elevator car with the inductive braking device are configured to provide a short-circuit to windings of an elevator hoisting motor.

In an embodiment, additionally or alternatively, the apparatus further comprises means for generating a signal indicating the condition of the inductive braking device; and means for transmitting the signal to a remote maintenance server.

In an embodiment, additionally or alternatively, the inductive braking device comprises a dynamic braking device comprising an elevator hoisting motor and one or more switches adapted to provide a short-circuit to windings of the elevator hoisting motor.

According to a third aspect of the invention, there is provided a computer program comprising program code, which when executed by at least one processing unit, causes the at least one processing unit to perform the method of the first aspect.

In an embodiment, the computer program is embodied on a computer readable medium.

According to a fourth aspect, there is provided an apparatus for condition monitoring of an inductive braking device of an elevator car in an elevator shaft. The apparatus comprises at least one processing unit and at least one memory. The at least one memory stores program instructions that, when executed by the at least one processing unit, cause the apparatus to cause electromechanical brakes to hold the elevator car stationary in the elevator shaft; cause actuation of a braking condition for the elevator car with the inductive braking device; cause the electromechanical brakes to lift while the inductive braking device is in the braking condition; determine a value associated with the inductive braking device in response to causing the electromechanical brakes to lift while the inductive braking device is actuated; and determine an operating condition of the inductive braking device based on the value.

In an embodiment, determining the value comprises determining a speed of the elevator car; and determining the operating condition of the inductive braking device further comprises comparing the speed to a predefined speed threshold; and determining that the inductive braking device is operational when the speed does not exceed the predefined speed threshold.

In an embodiment, additionally or alternatively, the apparatus is further configured to determine a location of the elevator car in the elevator shaft; and apply a predefined speed threshold that is specific for the location of the elevator car in the elevator shaft.

In an embodiment, additionally or alternatively, determining the value comprises determining a torque ripple based on at least one of signals from an accelerometer determining vibrations from the elevator car, signals from a motor encoder determining vibrations from a hoisting machine, signals from an encoder determining vibrations from an overspeed governor, or signals from a car encoder determining vibrations from the elevator car; and wherein determining the operating condition of the inductive braking device further comprises comparing the determined torque ripple to a reference torque ripple; and determining that the inductive braking device is not operational when the torque ripple has substantially increased compared to the reference torque ripple.

In an embodiment, additionally or alternatively, determining the value comprises determining a three-phase current of a motor of a hoisting machine of the elevator from current sensor of a frequency converter coupled to the motor; and wherein determining the operating condition of the inductive braking device further comprises determining that the inductive braking device is not operational when at least one of the current sensors indicates that a phase is missing current.

In an embodiment, additionally or alternatively, determining the value comprises determining voltage from poles of a motor of a hoisting machine of the elevator; and wherein determining the operating condition of the inductive braking device further comprises determining that the inductive braking device is not operational when at least one pole shows voltage.

In an embodiment, additionally or alternatively, the apparatus is further configured to repeat the condition monitoring when the operation condition indicates that the inductive braking device is not operational.

In an embodiment, additionally or alternatively, the apparatus is further configured to repeat the condition monitoring of the inductive braking device at regular intervals.

In an embodiment, additionally or alternatively, the apparatus is further configured to, in response to determining the operating condition of the inductive braking device, take the elevator car out of service when the inductive braking device is not operational.

In an embodiment, additionally or alternatively, the apparatus is further configured to, in response to determining the operating condition of inductive braking device, enable the use of the inductive braking device as an independent braking function or as an assistive brake when the inductive braking device is operational.

In an embodiment, additionally or alternatively, when causing actuation of a braking condition for the elevator car with the inductive braking device, the apparatus is configured to provide a short-circuit to windings of an elevator hoisting motor.

In an embodiment, additionally or alternatively, the apparatus is further configured to generate a signal indicating the condition of the inductive braking device; and transmit the signal to a remote maintenance server.

In an embodiment, additionally or alternatively, the inductive braking device comprises a dynamic braking device comprising an elevator hoisting motor and one or more switches adapted to provide a short-circuit to windings of the elevator hoisting motor.

According to a fifth aspect of the invention, there is provided an elevator system comprising at least one elevator car and the apparatus of the second or fourth aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a solution that monitors braking capability of an inductive braking device. Monitoring the operating condition of the inductive braking device may ensure safe use, and thus the inductive braking device may be used as part of a braking system of an elevator.

In addition to electromechanical brakes, the braking system of an elevator may have electrical braking means, such as dynamic brakes. The braking system of an elevator may also comprise other alternative or additional brakes, such as an eddy-current brake. The term "inductive braking device" may herein refer, for example, to a dynamic brake and/or an eddy-current brake. Further, in an example, the term "inductive braking device" may refer to a braking device operated by inductive power, for example, by power generated by a braking/regenerating motor. Further, in an embodiment, a motor inverter operating in a regenerative mode, receiving electrical power from the motor may be an "inductive braking device". Further, in an example, the inductive braking device may comprise a dynamic braking device comprising an elevator hoisting motor and one or more switches adapted to provide a short-circuit to windings of the elevator hoisting motor.

A dynamic brake may be implemented with a contactor, where contacts are used to put motor windings in a short circuit. When motor windings are short-circuited, the motor creates a braking torque when a rotor of the motor is rotated. However, the contactor used to implement the inductive braking device condition may get stuck or the contacts may not make contact. Therefore, the proper function of dynamic braking cannot be always guaranteed.

Figure 1:
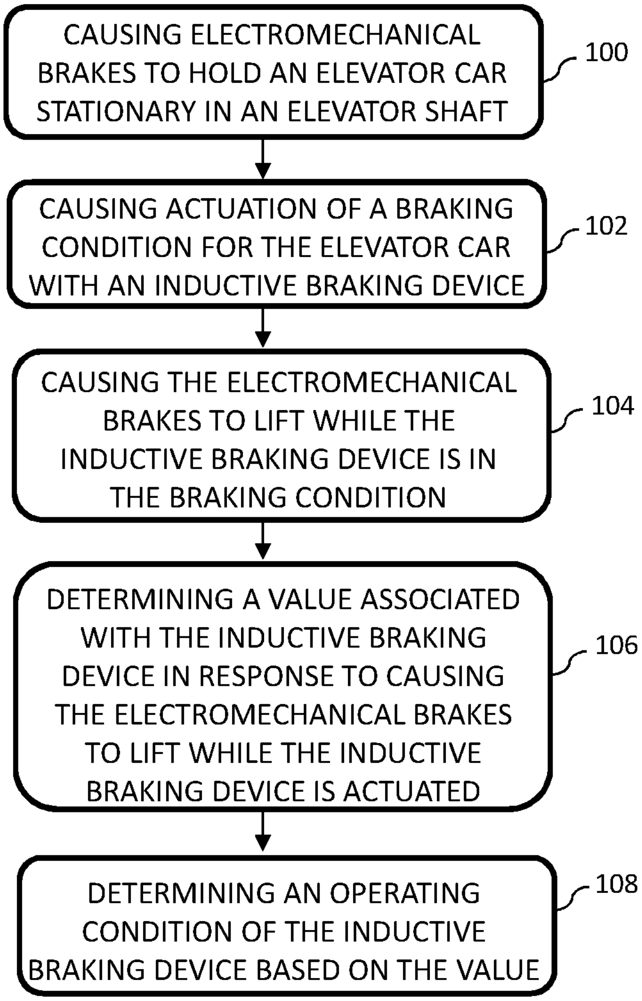
FIG. 1 illustrates a flow chart of a method for condition monitoring of inductive braking device of an elevator car in an elevator shaft according to an embodiment.

FIG. 1 illustrates a flow chart of a method for condition monitoring of an inductive braking device of an elevator car in an elevator shaft according to an aspect. The method may be performed, for example, by an apparatus, a controller or an elevator group controller of an elevator system. Further, the method may be a computer-implemented method.

At 100 electromechanical brakes associated with the elevator car are caused to hold the elevator car stationary in the elevator shaft. Before applying the electromechanical brakes, a determination may be made whether the elevator car is empty or that there are no passengers in the elevator car. This ensures that the condition monitoring is performed only when the elevator car is not currently used to transport passengers. Further, a determination or check may be made that the doors of the elevator car are closed.

At 102 a braking condition for the elevator car with the inductive braking device is caused to actuate. Actuation of the braking condition may be implemented, for example with an external contactor or with electronics, for example, by means of a solid state switch of a frequency converter of a motor of the elevator car. The braking condition may be implemented also with electromagnets or permanent magnets mounted to the elevator car in order to create eddy currents. In an embodiment, causing actuation of the braking condition for the elevator car with the inductive braking device comprises providing a short-circuit to windings of an elevator hoisting motor.

At 104 the electromechanical brakes are caused to lift while the inductive braking device is still in the braking condition. Control circuits may be designed in such a way that it is possible to lift the electromechanical brakes without activating a drive and without disabling the inductive braking device. If there is a counterweight associated with the elevator car, the elevator car should start moving upwards in response to the lifting of the electromechanical brakes. If there is no counterweight, the elevator car should start moving downwards in response to the lifting of the electromechanical brakes.

At 106 a value associated with the inductive braking device is determined. The value is determined in response to causing the electromechanical brakes to lift while the inductive braking device is in braking condition. The value represents the capability of the inductive braking device to brake the elevator car when the electromechanical brakes are not applied any more.

At 108 the operating condition of the inductive braking device is determined based on the value.

In an embodiment, determining the value associated with the inductive braking device at 106 may comprise determining a speed of the elevator car. After the electromechanical brakes are lifted, the elevator car may start to move due to gravity. The speed of the elevator car is then determined while the inductive braking device is in the braking condition. Thereafter, the operating condition of the inductive braking device may be determined at operation 108 by comparing the speed of the elevator car to a predefined speed threshold. The predefined speed threshold may be set or selected, for example, based on a nominal speed of the elevator car, the highest acceptable buffer collision speed, an inspection speed or a rescue speed of the elevator. If the speed of the elevator car does not exceed the predefined speed threshold, it may be determined that the inductive braking device is operational. On the other hand, if the speed of the elevator car exceeds the predefined speed threshold, it may be determined that the inductive braking device is not operational.

Additionally, the location of the elevator car in the elevator shaft may be determined, and a predefined speed threshold may be applied that is specific for the location of the elevator car in the elevator shaft. In other words, different speed thresholds may be applied in different parts of the elevator shaft.

Determination of the operating condition of inductive braking device, as illustrated by steps 100-108, may be repeated when the operation condition indicates that the inductive braking device is not operational. For example, the determination of the operating condition of inductive braking device may be repeated when the determined speed exceeds the predetermined speed threshold. Thus, the earlier condition monitoring result may be confirmed.

In an embodiment, in response to determining the operating condition of the inductive braking device, a signal may be generated indicating the condition of the inductive braking device. Further, the signal may be transmitted to a remote maintenance server.

Figure 2A:
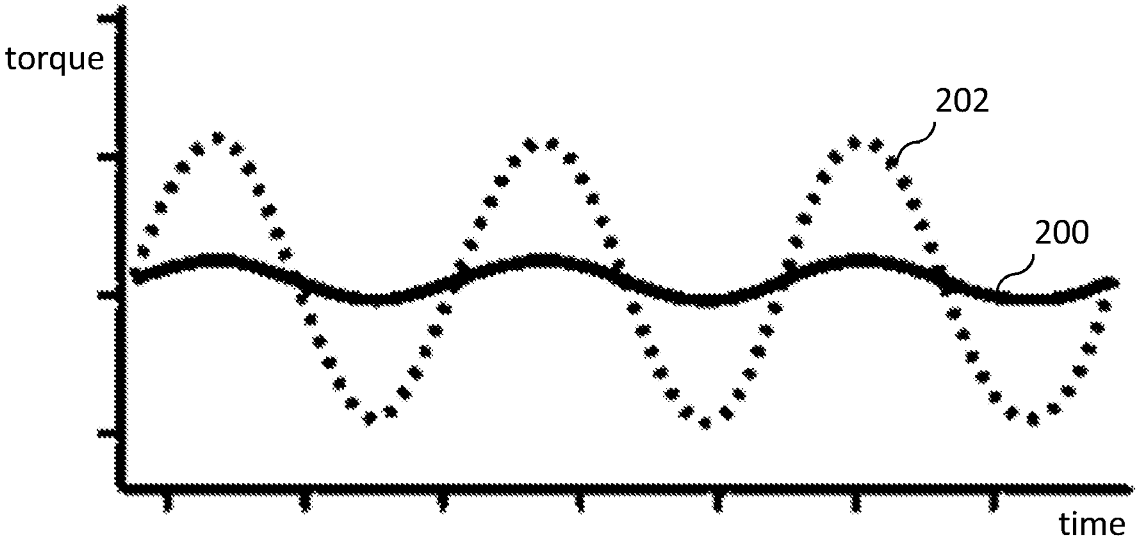
FIG. 2A illustrates an exemplary graph of torque values when the inductive braking device is applied.

FIG. 2A illustrates an exemplary graph of torque values when the inductive braking device is applied. In an embodiment, the value associated with the inductive braking device may be a torque ripple. The torque ripple may be determined based on at least one of signals from an accelerometer determining vibrations from the elevator car, signals from a motor encoder determining vibrations from a hoisting machine, signals from an encoder determining vibrations from an overspeed governor, or signals from a car encoder determining vibrations from the elevator car.

Figure 2B:
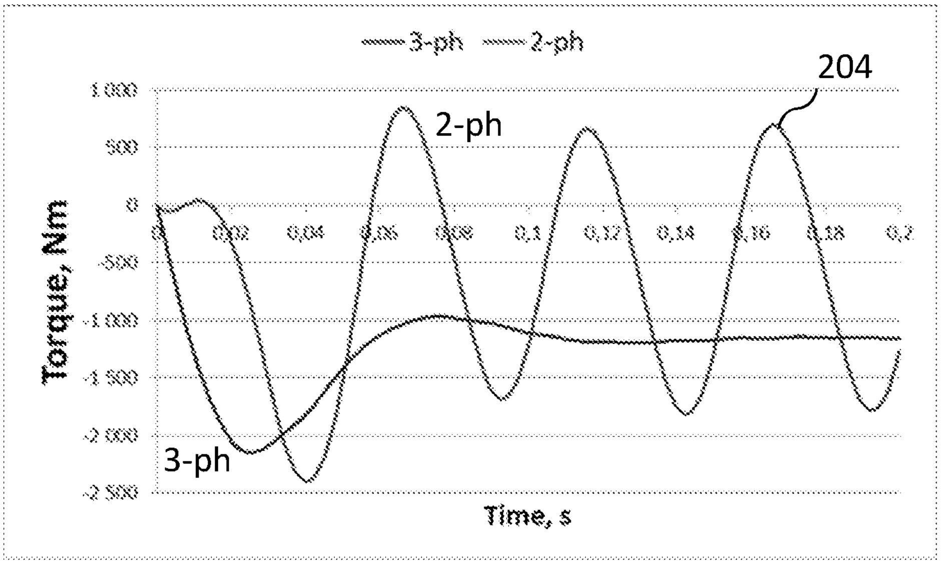
FIG. 2B illustrates an exemplary graph of torque values when the inductive braking device is applied.

The torque ripple may be compared to a reference torque ripple. In FIG. 2A, a curve 200 illustrates a reference torque ripple that may be, for example, a torque ripple generated when a motor of a hoisting machine of the elevator receives three-phase current. When the motor receives current in all three phases, the torque may be substantially steady. When at least one phase is missing a current, the torque ripple may increase substantially, as illustrated by a curve 202. For example, when during dynamic braking one motor phase is missing, the torque ripple may be so high that motor torque actually momentarily changes polarity, as illustrated by a curve 204 in FIG. 2B,. The operating condition of the inductive braking device may then be determined, for example, based on the comparison of the torque ripples 200 and 202. In response to the comparison, it may be determined that the inductive braking device is not operational when the determined torque ripple has substantially increased compared to the reference torque ripple.

In another embodiment, determining the value associated with the inductive braking device comprises determining a three-phase current of a motor of a hoisting machine of the elevator car from current sensors of a frequency converter coupled to the motor. The frequency converter may have a current sensor at each phase feeding current to the motor. The operating condition of the inductive braking device may be determined based on an indication from the sensors that at least one phase of the motor current has dropped. If at least one of the current sensors of the frequency converter indicates that there is no current, a phase may have dropped.

In another embodiment, determining the value associated with the inductive braking device may comprise determining a voltage from poles of a motor of a hoisting machine of the elevator car. The operating condition of the inductive braking device may be determined based on the voltage by determining that the inductive braking device is not in operative condition when at least one of the poles shows voltage.

Further, the operating condition of the inductive braking device may be monitored at regular intervals. The monitoring process may be repeated, for example, at the same time when the condition of the electromechanical brakes of the elevator car is monitored. The monitoring interval may be, for example, several hours or a day.

In response to determining that the inductive braking device is not operational, the elevator car may be taken out of service and/or a service call may be dispatched.

In response to determining that the inductive braking device is operational, the elevator may be operated normally. For example, in response to determining that the inductive braking device is operational, the use of the inductive braking device as an independent braking function or as an assistive brake may be enabled. For example, the inductive braking device may be used to fulfill ascending car overspeed protection. During a rescue operation, the electromechanical brakes may have to be lifted manually to move the elevator car to a landing floor by gravity. Then, the inductive braking device may be independently used to limit the speed of the elevator car. Low cost and reliable mechanical brake opening systems may be used for manual rescue operations as the condition of the inductive braking device may be monitored.

As another example, the inductive braking device may be as an assistive brake for the electromechanical brakes. For example, when the elevator car in a high-rise elevator system moves with overspeed near an elevator shaft end, a so called ETSL (Emergency Terminal Slowdown) safety function activates the electromechanical brakes to the stop elevator car. In this situation, inductive braking device may be used together with the electromechanical brakes. Thus, less braking force is required from the electromechanical brakes, and the electromechanical brakes may be dimensioned to be smaller, in high-rise buildings.

Figure 3:
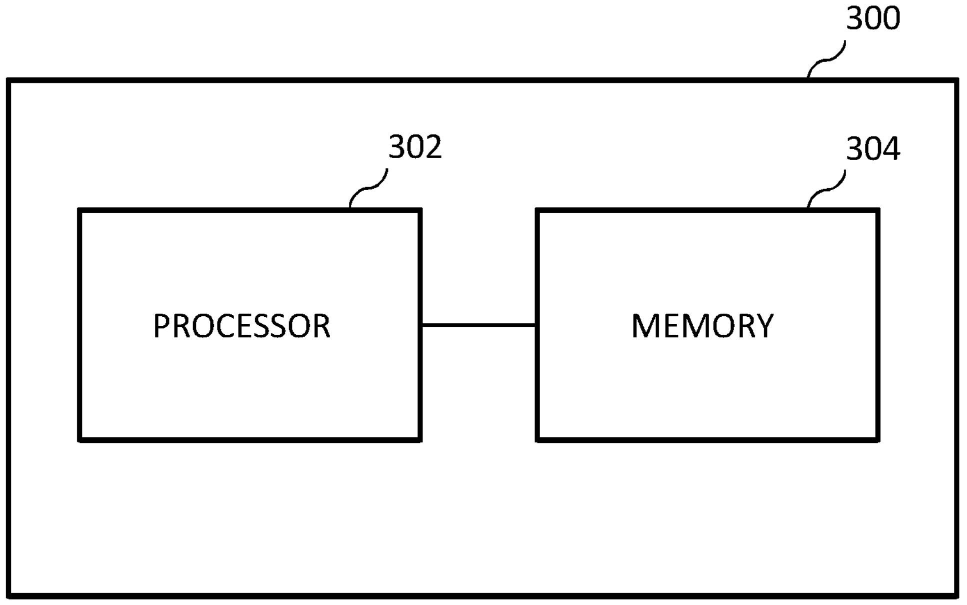
FIG. 3 illustrates a block diagram of an apparatus for condition monitoring of inductive braking device according to an embodiment.

FIG. 3 illustrates a block diagram of an apparatus 300 for monitoring condition of inductive braking device according to an embodiment.

The apparatus 300 comprises at least one processor 302 connected to at least one memory 304. The at least one memory 304 may comprise at least one computer program which, when executed by the processor 302 or processors, causes the apparatus 300 to perform the programmed functionality. In another embodiment, the at least one memory 304 may be an internal memory of the at least one processor 302.

The apparatus 300 may be a control entity configured to implement only the earlier discussed features, or it may be part of a larger elevator control entity, for example, an elevator controller or an elevator group controller.

In an embodiment, the at least one memory 304 may store program instructions that, when executed by the at least one processor 302, cause the apparatus 300 to cause electromechanical brakes to hold the elevator car stationary in the elevator shaft; cause actuation of a braking condition for the elevator car with the inductive braking device; cause the electromechanical brakes to lift while the inductive braking device is in the operative condition; determine a value associated with the inductive braking device in response to causing the electromechanical brakes to lift while the inductive braking device is actuated; and determine an operating condition of the inductive braking device based on the value. The at least one memory 304 may store program instructions that, when executed by the at least one processor 302, may cause the apparatus 300 to perform also any other above discussed step.

Further, in an embodiment, at least one of the processor 302 and the memory 304 may constitute means for means for causing electromechanical brakes to hold the elevator car stationary in the elevator shaft; means for causing actuation of a braking condition for the elevator car with the inductive braking device; means for causing the electromechanical brakes to lift while the inductive braking device is in the operative condition; means for determining a value associated with the inductive braking device in response to causing the electromechanical brakes to lift while the inductive braking device is actuated; and means for determining an operating condition of the inductive braking device based on the value. The at least one of the processor 302 and the memory 304 may constitute means for performing also any other above discussed step.

The exemplary embodiments and aspects of the invention can be included within any suitable device, for example, including, servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for condition monitoring of an inductive braking device of an elevator car in an elevator shaft, the method comprising:

causing electromechanical brakes to hold the elevator car stationary in the elevator shaft; then causing actuation of a braking condition for the elevator car with the inductive braking device; then causing the electromechanical brakes to lift while the inductive braking device is in the braking condition; then determining a value associated with the inductive braking device in response to causing the electromechanical brakes to lift while the inductive braking device is actuated; and then;

determining an operating condition of the inductive braking device based on the value.

2. The method of claim 1, wherein determining the value comprises determining a speed of the elevator car, and wherein determining the operating condition of the inductive braking device further comprises:

comparing the speed to a predefined speed threshold; and determining that the inductive braking device is operational when the speed does not exceed the predefined speed threshold.

3. The method of claim 2, further comprising:

determining a location of the elevator car in the elevator shaft; and applying a predefined speed threshold that is specific for the location of the elevator car in the elevator shaft.

4. The method of claim 1, wherein determining the value comprises:

determining a torque ripple based on at least one of signals from an accelerometer determining vibrations from the elevator car, signals from a motor encoder determining vibrations from a hoisting machine, signals from an encoder determining vibrations from an overspeed governor, or signals from a car encoder determining vibrations from the elevator car, and wherein determining the operating condition of the inductive braking device further comprises:

comparing the determined torque ripple to a reference torque ripple; and determining that the inductive braking device is not operational when the torque ripple has substantially increased compared to the reference torque ripple.

5. The method of claim 1, wherein determining the value comprises:

determining a three-phase current of a motor of a hoisting machine of the elevator from current sensors of a frequency converter coupled to the motor, and wherein determining the operating condition of the inductive braking device further comprises:

determining that the inductive braking device is not operational when at least one of the current sensors indicates that a phase is missing current.

6. The method of claim 1, wherein determining the value comprises:

determining voltage from poles of a motor of a hoisting machine of the elevator, and wherein determining the operating condition of the inductive braking device further comprises:

determining that the inductive braking device is not operational when at least one pole shows voltage.

7. The method of claim 1, further comprising:

repeating the condition monitoring when the operation condition indicates that the inductive braking device is not operational.

8. The method of claim 1, further comprising:

repeating the condition monitoring of the inductive braking device at regular intervals.

9. The method according to claim 1, further comprising:

in response to determining the operating condition of the inductive braking device, taking the elevator car out of service when the inductive braking device is not operational.

10. The method of claim 1, further comprising:

in response to determining the operating condition of the inductive braking device, enabling the use of the inductive braking device as an independent braking function or as an assistive brake when the inductive braking device is operational.

11. A computer program embodied on a non-transitory computer readable medium and comprising program code, which when executed by at least one processing unit, causes the at least one processing unit to perform the method of claim 1.

12. An apparatus for condition monitoring of an inductive braking device of an elevator car in an elevator shaft, the apparatus comprising:

means for causing electromechanical brakes to hold the elevator car stationary in the elevator shaft;

means for causing actuation of a braking condition for the elevator car with the inductive braking device while the electromechanical brakes hold the elevator car stationary in the elevator shaft;

means for causing the electromechanical brakes to lift while the inductive braking device is in the operative condition after causing the actuation of the braking condition for the elevator car with the inductive braking device;

means for determining a value associated with the inductive braking device in response to causing the electromechanical brakes to lift while the inductive braking device is actuated; and means for determining an operating condition of the inductive braking device based on the value.

13. The apparatus of claim 12, wherein the means for determining the value comprises means for determining a speed of the elevator car, and wherein the means for determining the operating condition of the inductive braking device further comprises:

means for comparing the speed to a predefined speed threshold; and means for determining that the inductive braking device is operational when the speed does not exceed the predefined speed threshold.

14. The apparatus of claim 13, further comprising:

means for determining a location of the elevator car in the elevator shaft; and means for applying a predefined speed threshold that is specific for the location of the elevator car in the elevator shaft.

15. The apparatus of claim 12, wherein the means for determining the value comprises determining a three-phase current of a motor of a hoisting machine of the elevator from current sensors of a frequency converter coupled to the motor, and wherein means for determining the operating condition of the inductive braking device further comprises:

means for determining that the inductive braking device is not operational when at least one of the current sensors indicates that a phase is missing current.

16. The apparatus of claim 12, wherein the means for determining the value comprises means for determining voltage from poles of a motor of a hoisting machine of the elevator, and wherein the means for determining the operating condition of the inductive braking device further comprises:

means for determining that the inductive braking device is not operational when at least one pole shows voltage.

17. The apparatus of claim 12, further comprising:

means for repeating the condition monitoring when the operation condition indicates that the inductive braking device is not operational.

18. The apparatus of claim 12, further comprising:

means for repeating the condition monitoring of the inductive braking device at regular intervals.

19. The apparatus of claim 12, further comprising:

means for, in response to determining the operating condition of inductive braking device, taking the elevator car out of service when the inductive braking device is not in operating condition.

20. The apparatus of claim 12, further comprising:

means for, in response to determining the operating condition of inductive braking device, enabling the use of inductive braking device as independent braking function or as an assistive brake when the inductive braking device is in operating condition.

21. An elevator system comprising:

at least one elevator car; and the apparatus of claim 12.

22. An apparatus for condition monitoring of an inductive braking device of an elevator car in an elevator shaft, the apparatus comprising:

means for causing electromechanical brakes to hold the elevator car stationary in the elevator shaft;

means for causing actuation of a braking condition for the elevator car with the inductive braking device;

means for causing the electromechanical brakes to lift while the inductive braking device is in the operative condition;

means for determining a value associated with the inductive braking device in response to causing the electromechanical brakes to lift while the inductive braking device is actuated; and means for determining an operating condition of the inductive braking device based on the value, wherein the means for determining the value comprises means for determining a torque ripple based on at least one of signals from an accelerometer determining vibrations from the elevator car, signals from a motor encoder determining vibrations from a hoisting machine, signals from an encoder determining vibrations from an overspeed governor, or signals from a car encoder determining vibrations from the elevator car, and wherein the means for determining the operating condition of the inductive braking device further comprises:

means for comparing the determined torque ripple to a reference torque ripple; and means for determining that the inductive braking device is not operational when the torque ripple has substantially increased compared to the reference torque ripple.

* * * * *